United States Patent Office 3,152,195
Patented Oct. 6, 1964

3,152,195
PROCESS FOR REACTIVATING A RHODIUM
TRICHLORIDE CATALYST
John J. Verbanc, Wilmington, Del., assignor to E. I. du
Pont de Nemours and Company, Wilmington, Del., a
corporation of Delaware
No Drawing. Filed Apr. 10, 1961, Ser. No. 101,680
8 Claims. (Cl. 260—680)

This invention is directed to an improvement in the preparation of acyclic hydrocarbon dienes by condensing ethylene or propylene with 1,3-butadiene in the presence of a rhodium trichloride catalyst, wherein the catalyst is reactivated by treatment with hydrochloric acid and, optionally, with ethanol.

Acyclic hydrocarbon dienes are starting materials for valuable polymeric compositions. They can be prepared by condensing monoenes, such as ethylene or propylene, with conjugated acyclic hydrocarbon dienes in the presence of a rhodium trichloride catalyst. It has been found that during the process the catalyst becomes de-activated and is not effective for further use. Unless some means can be used to reactivate the catalyst, the process becomes economically unfeasible.

It is, therefore, an object of this invention to provide a method whereby the herein described rhodium trichloride is reactivated after being utilized to condense monoenes with conjugated acyclic hydrocarbon dienes.

These and other objects will become apparent in the following description and claims.

More specifically, the present invention is directed to the preparation of acyclic hydrocarbon dienes having 6 to 7 carbon atoms by condensing ethylene or propylene with 1,3-butadiene in the presence of a rhodium trichloride catalyst, the improvement being that which comprises reactivating the resulting used catalyst by adding at least one mole of hydrochloric acid per mole of rhodium trichloride catalyst initially charged, to the catalyst residue obtained after removal of the diene and before reuse of said catalyst.

A preferred embodiment of this novel process is that wherein ethanol is also added to the catalyst residue.

The process in which the catalyst residue is to be reactivated in accordance with the present invention involves the reaction of ethylene or propylene with 1,3-butadiene to yield hexadienes or methylhexadienes. When ethylene is reacted with butadiene, the product is predominantly 1,4-hexadiene with a smaller amount of 2,4-hexadiene. When propylene is reacted with butadiene, the product is predominantly 2-methyl-1,4-hexadiene.

The reaction desired is the equimolecular reaction of the monoene with butadiene. However, the molar ratio of reactants in the reaction vessel at any instant may vary depending on the manner in which the process is carried out. Both reactants may be charged to the reaction vessel, continuously or batchwise, in approximately equimolar amounts. It is preferred, however, to have a slight molar deficiency of the monoene present in the reaction system since the monoene is more reactive with itself and with the reaction product than is the butadiene. Alternatively, one of the reactants, preferably the butadiene, may be charged to the reaction vessel, and the other reactant may be fed to the vessel during the course of the reaction until the desired conversion is attained.

For the initial use of the rhodium trichloride catalyst, it is necessary that the solid catalyst be dissolved in a liquid in order to provide a homogeneous reaction medium. It is preferred to use the trihydrate of the rhodium trichloride because of its ready solubility in solvents. The preferred solvent is ethanol, which may be aqueous or anhydrous. It is preferred to use absolute ethanol or the conventional 95 percent ethanol. The quantity of ethanol used to dissolve the rhodium trichloride trihydrate is not critical except that a sufficient amount should be used to dissolve the inorganic material. It is usually sufficient to use 25 to 30 ml. of 95 percent ethanol to dissolve 1 gram of rhodium trichloride trihydrate.

Only catalytic amounts of rhodium trichloride are used. The concentration of rhodium trichloride required depends on such variables as the residence time in the reactor, the temperature used, and the conversion desired. Amounts as low as 0.000005 mole of catalyst per mole of starting material (monoene plus butadiene) are effective. Usually not more than 0.01 mole of catalyst per mole of starting material is required. The preferred range is from 0.00001 to 0.0005. In the catalyst concentration below 0.00001 it may be desirable to add hydrochloric acid to the initial run.

The reaction medium consists of the butadiene, which is liquid at the pressures and temperatures used, containing the ethylene or propylene dissolved therein.

The process may be carried out at pressures in the range of from about 100 to about 700 p.s.i.g. This represents a practical range of pressures for generally available reactors. Higher or lower pressures may be used, if desired.

The process is carried out at temperatures in the range of about 50° C. to about 100° C. At temperatures below 50° C., the reaction proceeds too slowly to be practical. Temperatures above 100° C. may be used, but are not generally required. The preferred range is between 60° C. and 100° C.

The time required for reaction depends on the temperatures and pressures used, catalyst concentration, degree of conversion desired, and reactivity of the reactants. The practical range is from about 15 minutes to about 2 hours when ethylene and butadiene are reacted. When propylene is reacted with butadiene, up to 8 hours may be required since propylene is less reactive than ethylene.

In carrying out the herein described process by a batch process, a pressure reactor is charged with the catalyst solution. The reactor is then cooled, evacuated, and the diene compound is added. Agitation is begun, and ethylene or propylene is added. The reactor is then heated to the desired temperature and maintained at the desired temperature for sufficient time for the reaction to proceed to the desired conversion. At the end of the reaction time the autoclave is cooled to room temperature, and the contents are discharged; volatile products are then stripped. The crude product is separated from the catalyst residue by distillation. The catalyst residue which remains is a liquid of unknown composition. In addition to the rhodium trichloride initially charged, it contains by-products from the reaction, probably of polymeric nature. To this catalyst residue is added the desired amount of hydrochloric acid and, optionally, ethanol. The resulting composition is used as the catalyst for the next reaction run.

At least one mole of hydrochloric acid per mole of rhodium trichloride originally charged is required to reactivate the catalyst. Less than this amount gives insufficient reactivation. Any amount of hydrochloric acid in excess of this may be used. There is no advantage to be gained in using more than 40 moles of hydrochloric acid. The preferred range is 1.5 to about 15 moles of hydrochloric acid per mole of rhodium trichloride. The hydrogen chloride should be added as the aqueous acid, preferably as concentrated (37 percent) hydrochloric acid. The acid added may be more dilute, if desired, but there is no advantage to be gained by adding more dilute acid.

It has been found that the reactivating effect of the hydrochloric acid can be enhanced by the concomitant addition of ethanol to the catalyst residue. The quantity of ethanol is not critical since as little as 500 grams per mole of rhodium trichloride will afford some added reactivating effect. The preferred amount ranges from about 900 grams to about 25,000 grams per mole of rhodium trichloride. A greater amount of ethanol may be used, but there is no advantage to be gained. The ethanol may be anhydrous or aqueous. It is preferred to use 95 percent ethanol.

The addition of hydrogen chloride and, optionally, ethanol, to the catalyst after each run makes possible the use of the same batch of rhodium trichloride to catalyze many runs of the reaction. Without this reactivation step, the yield of product is drastically reduced after the initial run.

During a series of runs the catalyst residue gradually increases in weight because of the formation of high-boiling material. It is desirable to remove some of the excess material from time to time, as, for example, by distilling off, under vacuum, part of the accumulated organic material.

It is within the scope of this invention to operate the process in a continuous manner, as, for example, by continuously introducing monoene and butadiene into a reactor, which may be a series of reactors in cascade arrangement, continuously withdrawing reaction mixture, distilling off the diene product, treating the catalyst residue with hydrochloric acid and, optionally, ethanol, and continuously returning the treated catalyst residue to the reactor.

The diene compounds which are prepared by the process of this invention are valuable compounds for the preparation of elastomeric polymers. For example, 1,4-hexadiene is useful as a starting material for elastomeric polymers disclosed in U.S. 2,933,480. 1,4-hexadiene, 2,4-hexadiene, and 2-methyl-1,4-hexadiene can be polymerized to yield film-forming materials which are tough and free of tack upon baking.

Representative examples illustrating the present invention follow.

EXAMPLE 1

The experiments described in this example are carried out in a one-gallon glass-lined autoclave equipped with an agitator, a gas inlet, a thermocouple well, a discharge leg, a vent and pressure gauge, and a vacuum inlet. The autoclave is fitted so that it can be heated or cooled by means of a jacket through which steam-water mixtures or coolants can be circulated.

The general procedure is as follows: The catalyst solution used in a given run is charged to the autoclave at atmospheric pressure through a fitting on the gas inlet tube which is sealed after the addition. The autoclave is then cooled to 0° C. or lower by circulating acetone which is cooled in a Dry Ice-acetone bath in an external coil through the autoclave jacket. The butadiene is charged by distillation into the evacuated autoclave through the gas inlet from a cylinder by weight. Agitation is begun and ethylene is charged by pressure from a cylinder by weight. Subsequently, the gas inlet is sealed and heating is begun with a steam-water mixture in the jacket to attain and hold a desired temperature range. The reaction time is taken as period from time when the temperature reaches 60° C. until the cooling water is applied.

At the end of the reaction time, the autoclave is cooled to 25–30° C. and the contents are discharged by pressure from the discharge leg into a container. The volatile products are stripped off using a rotary vacuum solvent stripper and a warm water bath under water aspirator vacuum. The distillate is collected in a Dry Ice-acetone cold trap. The residue in the stripper is weighed and retained for subsequent use as a catalyst. The collected distillate is washed three times with water to remove alcohol and to eliminate excess butadiene. The washed material is separated, weighed, dried over magnesium sulfate, and 0.02 percent, by weight, of N-phenyl-2-naphthylamine is added to stabilize the material. A sample of this material is analyzed by vapor phase chromatography to permit calculation of the yields of individual components. Separation of the individual components is achieved by distillation. In this and in subsequent examples the crude net yield is taken as the weight of the crude product minus the weight of the dissolved butadiene. Percent conversion is calculated from this using the formula:

$$\text{Percent conversion} = \frac{\text{weight of crude net yield} \times 100}{\text{weight of (ethylene plus butadiene)}}$$

Preparation of the catalyst solution for the first run involves dissolving the $RhCl_3 \cdot 3H_2O$ in the specified amount of 95 percent ethanol. Subsequent runs entail mixing of the catalyst residue which is an oily, red liquid with the stated amounts of 95 percent ethanol and concentrated (37 percent) hydrochloric acid. (1 ml. equals 0.012 mole of HCl.) The alcohol and acid solution are not miscible with the catalyst residue and give heterogeneous mixtures.

The results of the series of runs using ethylene and butadiene reported in Table I show the desirable effects of adding both acid and alcohol to the used catalyst residues.

The charge for each run of this series is 1000 grams of 1,3-butadiene (18.5 moles) and 500 grams of ethylene (17.8 moles). The catalyst is prepared by adding 1.0 gram of $RhCl_3 \cdot 3H_2O$ (0.0038 mole) to 30 ml. of 95 percent U.S.P. ethanol (about 23 grams of ethanol on a 100 percent basis which amounts to about 6050 grams per mole of catalyst). Each run is carried out for 60 minutes at 60–72° C. In each run after Run A, the catalyst used is the residue obtained from the preceding run to which has been added the indicated number of moles of hydrochloric acid and the indicated amount of ethanol.

*Table I*

| Run | HCl Added | | Ethanol Added,[c] grams | Crude Net Yield, grams | Percent Conversion | Percent Yield [a] | Percent Yield [b] | Cat. Residue, grams |
|---|---|---|---|---|---|---|---|---|
| | Mole | Mole/mole of cat. | | | | | | |
| A | 0 | 0 | 23 | 827 | 55.1 | 43.8 | 11.6 | 72 |
| B | 0 | 0 | 23 | 188 | 12.5 | 11.9 | 0.8 | 75 |
| C | 0 | 0 | 23 | 32 | 2.1 | 2.1 | 0 | 64 |
| D | 0.012 | 3.16 | 23 | 643 | 42.8 | 36.7 | 6.5 | 109 |
| E | 0.012 | 3.16 | 0 | 255 | 17.0 | 16.2 | 1.0 | 116 |
| F | 0.012 | 3.16 | 23 | 715 | 47.7 | 40.1 | 7.9 | 163 |

[a] Percent yield of 1,4-hexadiene $= \frac{\text{moles of 1,4-hexadiene} \times 100}{\text{moles of ethylene charged}}$.

[b] Percent yield of 2,4-hexadiene $= \frac{\text{moles of 2,4-hexadiene} \times 100}{\text{moles of ethylene charged}}$.

[c] Added as 30 ml. of 95% ethanol.

The above table shows that in Runs B and C, when no hydrochloric acid is added to the catalyst residue, the yield falls off sharply. However, in Run D, when 0.012 mole of hydrogen chloride is added to the catalyst residue, the crude net yield increases from 32 grams (Run C) to 643 grams. In Run E, when no ethanol is added to the catalyst residue, the yield again decreases somewhat but increases again in Run F when 0.012 mole of hydrogen chloride and 23 grams of ethanol are added to the catalyst residue.

EXAMPLE 2

A series of runs is carried out in a similar manner to that of Example 1. The catalyst is prepared by adding 1.0 gram of $RhCl_3 \cdot 3H_2O$ (0.0038 mole) to 25 ml. of 95 percent ethanol (about 18.5 grams of ethanol on a 100 percent basis which amounts to about 4870 grams per mole of catalyst). The charge for each run is 1000 grams of butadiene (18.5 moles) and 500 grams of ethylene (17.8 moles). Each run is carried out for 60 minutes at the temperatures shown in Table II.

The product is principally a mixture of 1,4-hexadiene and 2,4-hexadiene having an average composition of 5 moles of 1,4-hexadiene to 1 mole of 2,4-hexadiene.

Table II shows the data from the consecutive runs.

*Table II*

| Run | HCl Added | | Ethanol Added,a grams | Run Temp., °C. | Crude Net Yield, grams | Percent Conversion |
|---|---|---|---|---|---|---|
| | Mole | Mole/ mole of cat. | | | | |
| A | 0 | 0 | 18.5 | 52–59 | 714 | 47.6 |
| B | 0.006 | 1.58 | 18.5 | 52–66 | 690 | 46.0 |
| C | 0.006 | 1.58 | 18.5 | 58–66 | 668 | 44.6 |
| D | 0.006 | 1.58 | 18.5 | 58–64 | 477 | 31.8 |
| E | 0.006 | 1.58 | 18.5 | 62–67 | 650 | 43.3 |
| F | 0.006 | 1.58 | 18.5 | 58–64 | 581 | 38.7 |
| G | 0.006 | 1.58 | 18.5 | 59–68 | 581 | 38.7 |
| H | 0.006 | 1.58 | 18.5 | 60–63 | 394 | 26.3 |
| I | 0.012 | 3.16 | 18.5 | 58–60 | 546 | 36.4 |
| J | 0.024 | 6.32 | 18.5 | 60–64 | 613 | 40.8 |
| K | 0 | 0 | 0 | 60–64 | 35 | 2.3 | a Added as 25 ml. of 95 percent ethanol.

The above Table II shows that 10 runs are carried out with good yields of hexadiene. On the eleventh run, when no hydrochloric acid and no ethanol are added to the catalyst residue from the previous run, the crude yield drops from 613 grams to 35 grams.

EXAMPLE 3

A series of runs is made in a manner similar to that of Example 1 except for differences in amounts of hydrochloric acid, in amounts of ethanol, and in temperature, as indicated in Table III. The grams of ethanol per mole of catalyst correspond to about 3025 (11.5 grams), 4870 (18.5 grams), and 6050 (23 grams).

The product is principally a mixture of 1,4-hexadiene and 2,4-hexadiene having an average composition of about 4 moles of 1,4-hexadiene to 1 mole of 2,4-hexadiene.

*Table III*

| Run | HCl Added | | Ethanol Added,a grams | Run Temp., °C. | Crude Net Yield, grams | Percent Conversion |
|---|---|---|---|---|---|---|
| | Mole | Mole/ mole of cat. | | | | |
| A | 0.006 | 1.58 | 18.5 | 60–100 | 836 | 55.8 |
| B | 0.012 | 3.16 | 23 | 60–70 | 727 | 48.5 |
| C | 0.024 | 6.32 | 23 | 60–98 | 858 | 57.2 |
| D | 0.006 | 1.58 | 23 | 60–64 | 625 | 41.7 |
| E | 0.024 | 6.32 | 23 | 58–65 | 682 | 45.5 |
| F | 0.024 | 6.32 | 23 | 60–64 | 647 | 43.1 |
| G | 0.024 | 6.32 | 23 | 90–100 | 985 | 65.7 |
| H | 0.006 | 1.58 | 23 | 90–100 | 784 | 52.3 |
| I | 0.006 | 1.58 | 23 | 60–70 | 500 | 33.3 |
| J | 0.024 | 6.32 | 23 | 60–65 | 618 | 41.3 |
| K | 0.024 | 6.32 | 11.5 | 90–100 | 800 | 53.3 | a Added as 95 percent ethanol.

EXAMPLE 4

A series of runs is carried out by a process similar to that described in Example 1 except that propylene is used instead of ethylene. The catalyst is prepared initially by dissolving 3.0 grams of rhodium trichloride trihydrate in 90 ml. of 95 percent ethanol (about 69 grams of ethanol on a 100 percent basis). The charge for each run is 1000 grams of butadiene (18.5 moles) and 750 grams of propylene (17.8 moles). The temperature range for the runs is 60–99° C. Hydrochloric acid and ethanol are added to the catalyst after each run as indicated in Table IV. 69 grams of ethanol corresponds to about 6050 grams per mole of catalyst and 23 grams corresponds to about 2020 grams per mole of catalyst. Data from each run are shown in Table IV.

*Table IV*

| Run | HCl Added | | Ethanol Added,a grams | Duration of Run, minutes | Crude Net Yield, grams | Percent Conversion | Percent Yield b |
|---|---|---|---|---|---|---|---|
| | Mole | Moles/ mole of cat. | | | | | |
| A | 0 | 0 | 69 | 372 | 700 | 40.0 | 38.0 |
| B | 0 | 0 | 69 | 317 | 76 | 4.3 | 3.9 |
| C | 0.024 | 2.1 | 23 | 423 | 316 | 18.2 | 22.0 | a Added as 95 percent ethanol.
b Percent yield of 2-methyl-1,4-hexadiene
$$= \frac{\text{Moles of 2-methyl-1,4-hexadiene} \times 100}{\text{Moles of propylene charged}}.$$

EXAMPLE 5

A series of runs is carried out in a similar manner to that of Example 1. The catalyst is prepared by adding 0.25 gram of $RhCl_3 \cdot 3H_2O$ (0.00095 mole) to 30 ml. of absolute ethanol (about 23.6 grams, approximately 24,840 grams of ethanol per mole of catalyst). An additional 30 ml. of absolute ethanol and hydrochloric acid, as indicated in Table V, are added each time the catalyst residue is recharged to the autoclave. The charge for each run is 1000 grams of butadiene (18.5 moles) and 500 grams of ethylene (17.8 moles). Each run is carried out at the temperature and for the time shown in Table V. The product is principally a mixture of 1,4-hexadiene and 2,4-hexadiene having an average composition of 8.7 moles of 1,4-hexadiene to 1 mole of 2,4-hexadiene. Table V shows the data from the consecutive runs.

*Table V*

| Run | HCl Added | | Run Temp., °C. | Time, minutes | Crude Net Yield, grams | Percent Conversion |
|---|---|---|---|---|---|---|
| | Mole | Mole/ mole of cat. | | | | |
| A | 0.012 | 12.64 | 69–73 | 60 | 736 | 49.0 |
| B | 0.012 | 12.64 | 68–74 | 60 | 633 | 42.2 |
| C | 0.012 | 12.64 | 69–75 | 60 | 565 | 37.7 |
| D | 0.012 | 12.64 | 60–97 | 60 | 675 | 45.0 |
| E | 0.012 | 12.64 | 70–97 | 90 | 666 | 44.4 |
| F | 0.012 | 12.64 | 60–98 | 60 | 523 | 34.9 |
| G | 0.012 | 12.64 | 60–96 | 60 | 478 | 31.9 |
| H | 0.012 | 12.64 | 60–98 | 120 | 486 | 32.4 |
| I | 0.036 | 37.9 | 60–95 | 60 | 229 | 15.3 |
| J | 0.036 | 37.9 | 60–95 | 60 | 258 | 17.2 |

EXAMPLE 6

A series of runs is made in the following manner: To a 1.5-liter autoclave, equipped with an agitator and lined with polytetrafluoroethylene, is charged a solution of 152 grams (6.2 moles) of ethylene in 304 grams (5.6 moles) of butadiene, together with 0.4 gram of rhodium trichloride trihydrate (0.0015 mole) dissolved in 7.7 grams of absolute ethanol to which has been added 0.003 mole of concentrated hydrochloric acid. The reaction mass is agitated and held at a temperature of 70–85° C. for the times indicated in Table VI. The maximum pressure attained during the reaction is 700 p.s.i.g.

The hexadiene product together with unreacted ethylene, butadiene, and alcohol is separated by vacuum distillation at about 100 mm. Hg and 80° C. from the residue of catalyst salts dissolved in higher boiling hydrocarbon by-products. The hexadienes and some butadiene are condensed and recovered while the ethylene and remaining butadiene are removed as vapor. Ethanol is removed from the hexadienes by washing with water, after which the crude hexadienes are dried and the isomeric 1,4-hexadiene and 2,4-hexadiene are separated by distillation.

At the end of each run the catalyst residue is returned to the reactor. Concentrated hydrochloric acid and, in some cases, ethanol, are added to the residue, and the catalyst is used for the next run. Table VI shows the data from the series of runs.

Table VI

[1st series]

| Run | HCl Added | | Ethanol Added [a] | | Time at Reaction Temp., minutes | Crude Net Yield, grams | Percent Conversion |
|---|---|---|---|---|---|---|---|
| | Mole | Mole/mole of cat. | Grams | Grams/mole of cat. | | | |
| A | .003 | 2 | 7.7 | 5,130 | 22 | 216 | 36 |
| B | .003 | 2 | 7.7 | 5,130 | 21 | 107 | 18 |
| C | .024 | 16 | 3.8 | 2,530 | 26 | 202 | 33 |
| D | .036 | 24 | 0 | 0 | 36 | 141 | 23 |
| E | .060 | 40 | 0 | 0 | 36 | 154 | 25 |
| F | .036 | 24 | 0 | 0 | 50 | 131 | 22 |
| G | .060 | 40 | 0 | 0 | 91 | 104 | 17 |
| H | .060 | 40 | 3.8 | 2,530 | 57 | 151 | 25 |

[a] Ethanol added as ethyl alcohol containing about 2 percent benzene (about 0.77 gram of ethanol per ml.).

EXAMPLE 7

A series of runs is carried out in a 5-gallon glass lined autoclave in the following manner:

In the initial run the charge consists of 4400 grams (8.15 moles) of butadiene and 22.3 grams (0.085 mole) of rhodium trichloride trihydrate dissolved in 352 grams of absolute ethanol to which 1.07 moles of concentrated hydrochloric acid has been added. Ethylene is added continuously to maintain a constant reaction pressure of 150–160 p.s.i.g. The temperature is maintained at 68–71° C. for 71 minutes. The reaction products are recovered and the percent conversion is calculated, as described in Example 1. After each run the catalyst residue is returned to the reactor, treated with hydrochloric acid and absolute ethanol, and used as the catalyst for the next run.

Each succeeding run is carried out in the same manner using the amounts of butadiene and ethylene and the reaction times indicated in Table VII.

Table VII shows the data from the series of runs.

Table VII

| Run | Butadiene Charged, grams | Ethylene Charged, grams | HCl Added | | Ethanol Added | | Time at Reaction Temp., minutes | Crude Net Yield, grams | Percent Conversion |
|---|---|---|---|---|---|---|---|---|---|
| | | | Moles | Moles/mole of cat. | Grams | Gram/mole of cat. | | | |
| A | 4,400 | 1,400 | 1.07 | 12.6 | 352 | 4,150 | 71 | 2,030 | 35 |
| B | 4,400 | 1,270 | 0.28 | 3.0 | 79 | 940 | 90 | 2,568 | 45.3 |
| C | 4,450 | 1,270 | 0.30 | 3.5 | 79 | 940 | 89 | 2,465 | 43.1 |
| D | 4,480 | 1,270 | 0.30 | 3.5 | 79 | 940 | 136 | 2,737 | 47.6 |
| E | 4,450 | 1,270 | 0.60 | 7.1 | 119 | 1,400 | 107 | 2,460 | 43.0 |
| F | 4,400 | 1,400 | 0.72 | 8.5 | 158 | 1,860 | 120 | 3,086 | 53.2 |
| G | 4,400 | 1,180 | 0.72 | 8.5 | 158 | 1,860 | 160 | 1,858 | 33.3 |
| H | 4,450 | 863 | 1.20 | 14.1 | 227 | 2,670 | 121 | 1,769 | 33.3 |
| I | 4,480 | 1,270 | 0.60 | 7.1 | 158 | 1,860 | 127 | 2,633 | 45.8 |

It is understood that the preceding examples may be varied, within the scope of the total preceding specification disclosure, by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the reactivation of a rhodium trichloride catalyst residue which has become deactivated through use in the preparation of acyclic hydrocarbon dienes having 6 to 7 carbon atoms by condensing a member selected from the group consisting of ethylene and propylene with 1,3-butadiene, said process comprising mixing the resulting catalyst residue with at least one mole of aqueous hydrochloric acid solution per mole of rhodium trichloride catalyst initially charged.

2. A process as defined in claim 1 wherein from about 1.5 to 15 moles of an aqueous hydrochloric acid solution are used per mole of rhodium trichloride catalyst initially charged.

3. A process as defined in claim 1 wherein ethanol is added concomitant with said mixing step.

4. A process as defined in claim 3 wherein from about 900 to 25,000 grams of ethanol are added per mole of rhodium trichloride.

5. A process for the preparation of acyclic hydrocarbon dienes having 6 to 7 carbon atoms which comprises (I) condensing a member selected from the group consisting of ethylene and propylene with 1,3-butadiene in the presence of a rhodium trichloride catalyst until said catalyst becomes deactivated, (II) isolating the deactivated catalyst residue, (III) mixing the deactivated catalyst residue with at least one mole of aqueous hydrochloric acid solution per mole of catalyst initially charged, and (IV) using the resulting reactivated catalyst residue as a substitute for the catalyst used in step (I) above.

6. A process as defined in claim 5 wherein from about 1.5 to 15 moles of an aqueous hydrochloric acid solution are used in step (III) per mole of rhodium trichloride catalyst initially charged.

7. A process as defined in claim 5 wherein ethanol is added in step (III).

8. A process as defined in claim 7 wherein from about 900 to 25,000 grams of ethanol are added per mole of rhodium trichloride.

References Cited in the file of this patent

UNITED STATES PATENTS 2,113,028 Kuentzel _____ Apr. 5, 1938
3,013,066 Anderson _____ Dec. 12, 1961

FOREIGN PATENTS 1,214,719 France _____ Nov. 9, 1959